(12) United States Patent
Tian et al.

(10) Patent No.: US 11,113,207 B2
(45) Date of Patent: Sep. 7, 2021

(54) BYPASS PREDICTOR FOR AN EXCLUSIVE LAST-LEVEL CACHE

(71) Applicant: Samsung Electronics Co., Ltd., Suwon-si (KR)

(72) Inventors: Yingying Tian, Austin, TX (US); Tarun Nakra, Austin, TX (US); Vikas Sinha, Austin, TX (US); Hien Le, Cedar Park, TX (US)

(73) Assignee: SAMSUNG ELECTRONICS CO., LTD.

( * ) Notice: Subject to any disclaimer, the term of this patent is extended or adjusted under 35 U.S.C. 154(b) by 115 days.

(21) Appl. No.: 16/289,645

(22) Filed: Feb. 28, 2019

(65) Prior Publication Data

US 2020/0210347 A1 Jul. 2, 2020

Related U.S. Application Data

(60) Provisional application No. 62/785,213, filed on Dec. 26, 2018.

(51) Int. Cl.
*G06F 12/123* (2016.01)
*G06F 9/50* (2006.01)
(Continued)

(52) U.S. Cl.
CPC .......... *G06F 12/123* (2013.01); *G06F 9/5016* (2013.01); *G06F 12/0811* (2013.01); *G06F 12/0888* (2013.01)

(58) Field of Classification Search
CPC ............... G06F 1/00–3296; G06F 3/00; G06F 3/06–0689; G06F 5/00–16;
(Continued)

(56) References Cited

U.S. PATENT DOCUMENTS 5,533,189 A * 7/1996 Cheong ............... G06F 11/1064
714/52
5,546,559 A * 8/1996 Kyushima ............. G06F 12/127
711/133

(Continued)

OTHER PUBLICATIONS

M. Kharbutli and Y. Solihin, "Counter-Based Cache Replacement and Bypassing Algorithms," in IEEE Transactions on Computers, vol. 57, No. 4, p. 433-447, Apr. 2008 (Year: 2008).*

(Continued)

*Primary Examiner* — Daniel C. Chappell
(74) *Attorney, Agent, or Firm* — Renaissance IP Law Group LLP

(57) ABSTRACT

A system and a method to allocate data to a first cache increments a first counter if a reuse indicator for the data indicates that the data is likely to be reused and decremented the counter if the reuse indicator for the data indicates that the data is likely not to be reused. A second counter is incremented upon eviction of the data from the second cache, which is a higher level cache than the first cache. The data is allocated to the first cache if the value of the first counter is equal to or greater than the first predetermined threshold or the value of the second counter equals zero, and the data is bypassed from the first cache if the value of the first counter is less than the first predetermined threshold and the value of the second counter is not equal to zero.

20 Claims, 6 Drawing Sheets

(51) Int. Cl.
G06F 12/0811 (2016.01)
G06F 12/0888 (2016.01)

(58) Field of Classification Search
CPC .......... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 5,564,035 | A * | 10/1996 | Lai | G06F 12/0897 711/122 |
| 5,636,359 | A * | 6/1997 | Beardsley | G06F 12/0866 711/122 |
| 5,915,262 | A * | 6/1999 | Bridgers | G06F 12/0802 711/118 |
| 7,228,388 | B2 * | 6/2007 | Hu | G06F 12/0888 711/122 |
| 7,448,031 | B2 * | 11/2008 | Wu | G06F 8/4442 717/161 |
| 7,506,119 | B2 * | 3/2009 | Gao | G06F 12/0888 711/162 |
| 7,793,044 | B1 * | 9/2010 | Spracklen | G06F 12/0811 711/118 |
| 8,667,222 | B2 | 3/2014 | Gaur et al. | |
| 8,972,662 | B2 * | 3/2015 | Benhase | G06F 12/0888 711/122 |
| 9,058,269 | B2 * | 6/2015 | Krick | G06F 12/0815 |
| 9,110,718 | B2 * | 8/2015 | Moir | G06F 9/5066 |
| 9,195,606 | B2 * | 11/2015 | Natarajan | G06F 12/128 |
| 9,479,552 | B2 * | 10/2016 | Chen | H04L 67/22 |
| 9,501,411 | B2 * | 11/2016 | Guthrie | G06F 12/0811 |
| 9,600,442 | B2 * | 3/2017 | Hughes | G06F 9/30036 |
| 9,660,650 | B1 * | 5/2017 | Manohararajah | G06F 30/327 |
| 10,152,423 | B2 * | 12/2018 | Ash | G06F 12/0871 |
| 10,223,278 | B2 * | 3/2019 | Priyadarshi | G06F 12/0888 |
| 10,268,600 | B2 * | 4/2019 | Gaur | G06F 12/0862 |
| 10,417,736 | B2 * | 9/2019 | Baek | G06T 1/60 |
| 10,831,678 | B2 * | 11/2020 | Wang | G06F 12/126 |
| 2002/0099913 | A1 * | 7/2002 | Steely, Jr. | G06F 12/0897 711/122 |
| 2003/0084251 | A1 * | 5/2003 | Gaither | G06F 12/0804 711/133 |
| 2004/0088496 | A1 * | 5/2004 | Glasco | G06F 12/082 711/141 |
| 2004/0133748 | A1 * | 7/2004 | Yang | G06F 12/0897 711/144 |
| 2006/0224830 | A1 * | 10/2006 | Davis | G06F 12/127 711/136 |
| 2007/0055826 | A1 * | 3/2007 | Morton | G06F 12/0817 711/141 |
| 2007/0094450 | A1 * | 4/2007 | VanderWiel | G06F 12/126 711/133 |
| 2008/0059707 | A1 * | 3/2008 | Makineni | G06F 12/0897 711/122 |
| 2008/0320235 | A1 * | 12/2008 | Beckmann | G06F 12/126 711/144 |
| 2011/0087845 | A1 * | 4/2011 | Burger | G06F 12/0879 711/136 |
| 2012/0159073 | A1 * | 6/2012 | Jaleel | G06F 12/128 711/122 |
| 2012/0254550 | A1 * | 10/2012 | Gaur | G06F 12/122 711/138 |
| 2013/0042078 | A1 * | 2/2013 | Jalal | G06F 12/0815 711/146 |
| 2013/0166846 | A1 * | 6/2013 | Gaur | G06F 12/0897 711/122 |
| 2013/0325942 | A1 * | 12/2013 | Chen | H04L 67/2852 709/204 |
| 2014/0351524 | A1 * | 11/2014 | Natarajan | G06F 12/128 711/130 |
| 2015/0039836 | A1 * | 2/2015 | Wang | G06F 12/0804 711/136 |
| 2015/0186275 | A1 * | 7/2015 | Moga | G06F 12/0811 711/122 |
| 2016/0019184 | A1 * | 1/2016 | Hughes | G06F 9/30036 711/122 |
| 2016/0085677 | A1 * | 3/2016 | Loh | G06F 12/0864 711/143 |
| 2016/0232093 | A1 | 8/2016 | Kim et al. | |
| 2016/0259689 | A1 * | 9/2016 | Mukherjee | G06F 12/0802 |
| 2017/0293565 | A1 | 10/2017 | Priyadarshi et al. | |
| 2018/0129613 | A1 | 5/2018 | Faldu et al. | |
| 2018/0232311 | A1 * | 8/2018 | Bhati | G06F 12/0897 |
| 2018/0276140 | A1 * | 9/2018 | Quinnell | G06F 12/123 |
| 2018/0285268 | A1 * | 10/2018 | Korgaonkar | G06F 12/0897 |
| 2019/0034354 | A1 * | 1/2019 | Priyadarshi | G06F 12/128 |

OTHER PUBLICATIONS

C. Zhang, G. Sun, P. Li, T. Wang, D. Niu and Y. Chen, "SBAC: A statistics based cache bypassing method for asymmetric-access caches," 2014 IEEE/ACM International Symposium on Low Power Electronics and Design (ISLPED), 2014, pp. 345-350 (Year: 2014).*
G. Sun, C. Zhang, P. Li, T. Wang and Y. Chen, "Statistical Cache Bypassing for Non-Volatile Memory," in IEEE Transactions on Computers, vol. 65, No. 11, pp. 3427-3440, Nov. 1, 2016 (Year: 2016).*

* cited by examiner

BYPASS PREDICTOR FOR AN EXCLUSIVE LAST-LEVEL CACHE

CROSS-REFERENCE TO RELATED APPLICATION

This patent application claims the priority benefit under 35 U.S.C. § 119(e) of U.S. Provisional Patent Application No. 62/785,213, filed on Dec. 26, 2018, the disclosure of which is incorporated herein by reference in its entirety.

TECHNICAL FIELD

The subject matter disclosed herein generally relates to processing systems. More specifically, the subject matter disclosed herein relates to cache system and method for selectively bypassing allocation of a block of evicted data in an exclusive last-level cache.

BACKGROUND

Last-level caches (LLCs) are generally designed to be exclusive caches by storing data that has been cast out from an upper-level cache to preserve higher-level replacement victims for possible future reference. Not all cast-out data from an upper-level cache are useful to be cached in an LLC. For example, the cast-out data may contain useless blocks, such as non-temporal data and/or dead code and data. Bypassing the LLC for such useless cast outs and allocating useful cast outs to an LLC may save interconnect bandwidth and power, and may improve cache performance. Yet, bypassing from exclusive last-level caches (LLC) may be challenging because a LLC is unaware of program behavior as cache accesses are filtered out through higher-level caches as high-level evictions carry no program behavior information. Additionally, there is a lack of locality information in an exclusive cache because reused cache lines may be swapped back to upper-level caches, leaving no recency information to track.

Some exclusive cache management techniques may keep track of the reuse distance of data in the exclusive LLC, and respectively allocate the data at different positions of the Least-Recently-Used (LRU) stack. In order to avoid evicting the line on a subsequent fill to the same cache set, the insertion position in the stack needs to be higher than the lowest LRU position, such as LRU+1 or MRU location. However, such a cache management technique will thrash an exclusive cache when the workloads contain streaming or non-temporal patterns. For example, if a reuse distance for a requested block of data is greater than the capacity of upper-level caches and the LLC, the block of data obtained from DRAM will be inserted in the LLC, and eventually evicted before any reuse. If the block of streaming data is allocated in the LRU+1 or higher position of the LLC, the allocated streaming data replaces other blocks of data that could be re-referenced if they were kept in the LLC.

SUMMARY

An example embodiment provides a method to allocate data evicted from a first cache to a second cache that may include: determining whether a reuse indicator for a block of data indicates that the block of data is likely to be reused upon eviction of the block of data from a first cache, the first cache being a higher level cache than the second cache; incrementing a first counter if the reuse indicator for the block of data indicates that the block of data is likely to be reused; decrementing the first counter if the reuse indicator for the block of data indicates that the block of data is likely not to be reused; incrementing a second counter upon eviction of the block of data from the first cache; comparing a value of the first counter to a first predetermined threshold; determining whether a value of the second counter is equal to zero; storing the block of data to the second cache if the value of the first counter is equal to or greater than the first predetermined threshold or the value of the second counter equals zero; and writing the block of data to the system memory while bypassing the second cache if the value of the first counter is less than the first predetermined threshold and the value of the second counter is not equal to zero.

Another example embodiment provides a method to allocate data evicted from a first cache to a second cache that may include: determining whether a reuse indicator for a block of data indicates that the block of data is likely to be reused upon eviction of the block of data from a first cache, the first cache being a higher level cache than the second cache; incrementing a first counter if the reuse indicator for the block of data indicates that the block of data is likely to be reused; decrementing the first counter if the reuse indicator for the block of data indicates that the block of data is likely not to be reused; incrementing a second counter upon eviction of the block of data from the second cache; determining whether a value of the first counter is less than a first predetermined threshold; determining whether a value of the second counter is equal to zero; allocating the block of data to a location in the second cache that is above a least recently used location in the second cache if the value of the first counter is equal to or greater than the first predetermined threshold or the value of the second counter equals zero; and allocating the block of data in a least recently used location in the second cache if the value of the first counter is less than the first predetermined threshold and the value of the second counter is not equal to zero.

Still another example embodiment provides a cache system that may include a first cache, a second cache and a cache controller. The first cache may include at least one block of data, each block of data may include a tag, each tag may include a plurality of bits, and at least one bit of each tag may provide a reuse indicator of a probability that the block of data will be reused. The second cache may be a lower-level cache than the first cache. The cache controller may be coupled to the first cache and the second cache. The cache controller may include a first counter and a second counter. The cache controller may increment the first counter if the reuse indicator for a first block of data indicates that the first block of data is likely to be reused upon eviction from the first cache and decrement the first counter if the reuse indicator for the first block of data indicates that the first block of data is likely not to be reused upon eviction from the first cache. The cache controller may further increment a second counter upon eviction of the first block of data from the first cache. The cache controller may provide an indication to allocate the first block of data to the second cache if a value of the first counter is equal to or greater than a first predetermined threshold or a value of the second counter equals zero, and may provide an indication for the first block of data to bypass the second cache if the value of the first counter is less than the first predetermined threshold and the value of the second counter is not equal to zero.

Yet another example a cache system may include a first cache, a second cache and a cache controller. The first cache may include at least one block of data, each block of data may include a tag, each tag may include a plurality of bits, and at least one bit of each tag may provide a reuse indicator of a probability that the block of data will be reused. The second cache may be a lower-level cache than the first cache. The cache controller may be coupled to the first cache and the second cache. The cache controller may include a first counter and a second counter. The cache controller may increment the first counter if the reuse indicator for a first block of data indicates that the first block of data is likely to be reused upon eviction from the first cache and decrement the first counter if the reuse indicator for the first block of data indicates that the first block of data is likely not to be reused upon eviction from the first cache. The cache controller may further increment a second counter upon eviction of the first block of data from the first cache. The cache controller may provide an indication to allocate the first block of data to the second cache in a location above a least recently used (LRU) location if a value of the first counter is equal to or greater than a first predetermined threshold or a value of the second counter equals zero, and may provide an indication to allocating the first block of data in a least recently used location in the second cache if the value of the first counter is less than the first predetermined threshold and the value of the second counter is not equal to zero.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
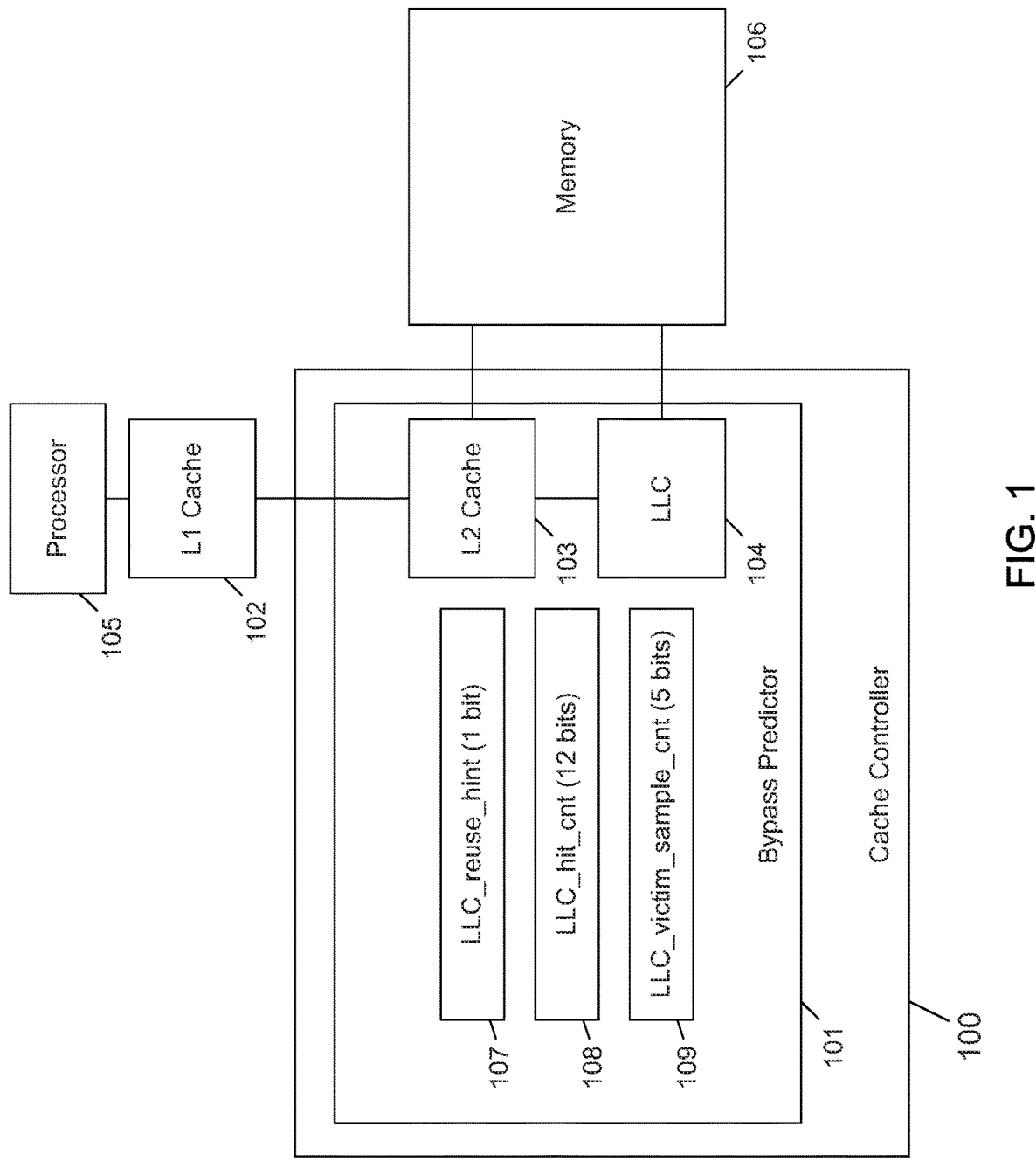
FIG. 1 depicts a functional block diagram of an example embodiment of a cache controller that includes a bypass predictor according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "module," as used herein, refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides a cache controller that includes a bypass predictor for exclusive caches, such LLCs, in which the bypass predictor includes references to data in an exclusive LLC that is swapped data back to a higher-level cache as well as reuse information for the data. The cache controller may cast out a victim from a higher-level cache to the exclusive LLC if the prediction indicates to not bypass (i.e., a high probability of reuse) and may drop, or write-through, the victim if the prediction indicates to bypass (i.e., a low probability of reuse). The cache controller may be driven by one or more higher-level caches by tracking an overall reuse pattern of the exclusive LLC and use a bypass prediction when the confidence of such a prediction is high.

The subject matter disclosed herein provides a coordinated cache management technique for exclusive caches. For example, using a 3-level cache hierarchy (L1, L2 and LLC) as disclosed herein, an L2 cache may track cache reuse and a bypass predictor that is part of a cache controller may use the reuse information to indicate that locations in the LLC be allocated to L2 evictions. To track the reuse, the bypass predictor may dynamically detect whether the working set is thrashing the LLC. If the bypass predictor predicts, or indicates thrashing, the cache controller may control the LLC to allocate blocks at LRU or, alternatively, bypass the evictions to preserve blocks in the LLC that may have a higher probability of reuse.

The bypass predictor for a cache controller disclosed herein uses a minimal amount of overhead, and can provide thrash resistance for exclusive LLCs. A higher-level cache may detect cache lines that thrash the exclusive LLC, and filter out those cache lines to only allocate re-usable blocks to the exclusive LLC to save cache capacity and power, and improve performance.

In one embodiment, a cache system may be configured as a three-level cache hierarchy that includes an L1 cache, an inclusive L2 cache, and an exclusive LLC cache. Tags of the L2 cache store LLC hit/miss information (LLC metadata) of lines in the L2 cache. Fill data allocated to the L2 cache indicate the source of data (i.e., DRAM or the LLC). The bypass predictor of the cache controller learns, or adapts, based on the LLC metadata of lines evicted from the L2 cache. If the LLC metadata indicates a poor LLC hit ratio, then the bypass predictor predicts that a next L2 cast out to be a LLC-bypassable cast out. Cast outs from the L2 cache that have been predicted as being LLC-bypassable may be dirty, in which case the cast-out data is sent directly to DRAM, thereby avoiding an LLC spill and fill situation. Alternatively, a cast out from the L2 cache may be clean, in which case no data is cast out. In one embodiment, an address of cast out may be used to update a downstream snoop filter. In addition to using LLC reuse history, the bypass predictor disclosed herein may use the reuse information of the L2 cache as part of a basis for a prediction, which may add more confidence to the prediction if the line was neither reused in the L2 cache or the LLC cache.

The bypass predictor for a cache controller disclosed herein provides a thrash-resistant mechanism for an LLC. As part of the mechanism, the bypass predictor may be configured to periodically send cast-outs to the LLC, even in a situation in which an application is thrashing the LLC. If, for example, all L2 evictions are being predicted as being LLC-bypassable, detecting that the application has shifted to a more cache-friendly phase may not be easy. To overcome this, the bypass predictor disclosed herein may periodically indicate that cast outs be sent to the LLC, even in an extreme bypass mode. The periodic sending of cast-outs may be used by the bypass predictor to sample the LLC hit rate for training, or adapting, the predictor. For large working sets, sampling allows a subset to be preserved in LLC and provides thrash resistance. In one embodiment, the sample rate may be set to be a power of 2. For example, one cast-out is allocated to the LLC for every 32 cast outs. Thrash resistance may be provided if the working set≤LLC size*Sample Rate.

FIG. 1 depicts a functional block diagram of an example embodiment of a cache controller 100 that includes a bypass predictor 101 according to the subject matter disclosed herein. The cache controller 100 may control a three-level cache hierarchy that includes an L1 cache 102, an inclusive L2 cache 103, and an exclusive LLC 104. The caches 102-104 may be connected to one or more processors 105, of which only one processor is depicted, and a main memory 106. The cache controller 100 is shown encompassing the L2 cache 103 and the LLC 104 to convey logic and/or functionality related to managing and/or controlling allocating or bypassing of victims from the L2 cache either to the LLC 104 or to the main memory 106. The entire system depicted in FIG. 1 may be a computing device that may be part of, but not limited to, a computer, a handheld device, a smartphone, a personal digital assistant (PDA), a navigation device, a communications device or an entertainment device. Additionally, the entire system depicted in FIG. 1 may include other components or devices that are not shown, such as, but not limited to, a display device, an input device, a mass storage device and a communication interface.

It should be understood that the representations of the cache controller 100 and of the bypass predictor 101 are not intended as a limitation because any alternative implementation is possible for the functionality described herein. In one embodiment, the cache controller 100 and/or the bypass predictor 101 may be modules that are embodied as any combination of software, firmware and/or hardware configured to provide the functionality described herein.

The bypass predictor 101 may include a hint bit 107, and a first counter 108. In one embodiment, the bypass predictor may further include a second counter 109. Although example bit sizes are indicated below for the hint bit 107, the first counter 108 and the second counter 109, it should be understood that bit sizes may be used that are different from the example sizes described.

The hint bit 107 may be a 1-bit indicator and is referred to herein as an LLC_reuse_hint bit 107. There may be one hint bit 107 per L2 tag. In one embodiment, the LLC_reuse_hint bit 107 may be set if a request hits in LLC.

The first counter 108 may be a 12-bit saturating counter per L2 bank and is referred to herein as LLC_hit_cnt counter 108 or a global LLC_hit_cnt counter 108. The LLC_hit_cnt 108 may be used for tracking requests. At initialization, the LLC_hit_cnt counter 108 may be set to 0xfff. Upon an L2 cache victim, the LLC_hit_cnt counter is incremented or decremented based on the LLC_reuse_hint bit associated with the tag of the line that is victimized. If the value of a LLC_hit_cnt is less than a value of a low_hit_threshold, then the bypass predictor 101 indicates that the L2 victim bypass the LLC 104, otherwise the L2 victim is cached in the LLC 104.

The second counter 109 may be a saturating 5-bit counter referred to herein as the LLC_victim_sample_cnt counter 109. There may be one LLC_victim_sample_cnt counter 109 per L2 bank. The LLC_victim_sample_cnt counter 109 may be incremented for every L2 cache victim (0 to 31, with a roll over from 31 to 0.) If the LLC_victim_sample_cnt equals 0, the victim is allocated to the LLC regardless of a prediction decision. This allows training to continue if the predictor is in a bypass mode.

Figure 2:
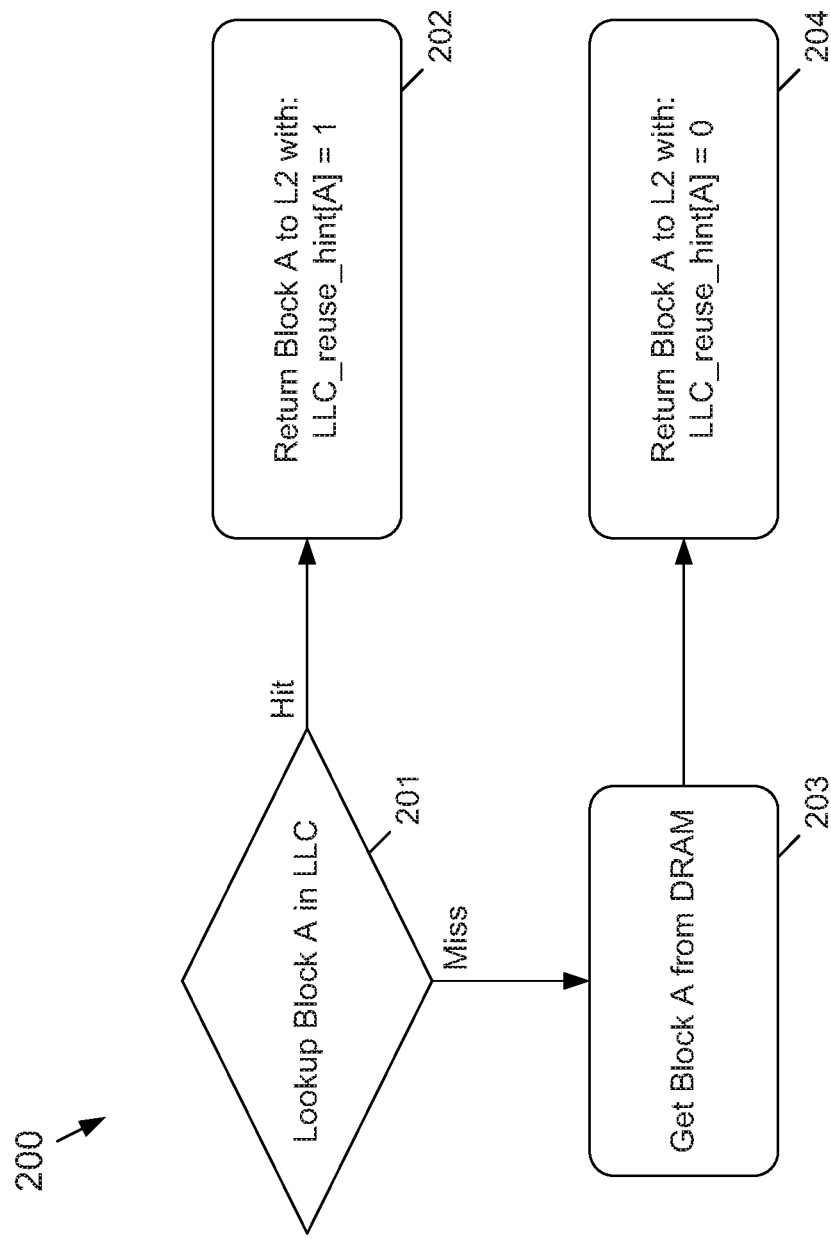
FIG. 2 depicts a flowchart of an example embodiment of a process used by the bypass predictor if a block A of data is looked up in the LLC according to the subject matter disclosed herein.

FIG. 2 depicts a flowchart of an example embodiment of a process 200 used by the bypass predictor 101 if a block A of data is looked up in the LLC according to the subject matter disclosed herein. At 201, it is determined whether the block A is in the LLC 104. If there is a hit, flow continues to 202 where block A is returned to the L2 cache 103 and the LLC_reuse_hint[A] bit is set to 1. If at 201, there is a miss, flow continues to 203 where the block A is obtained from DRAM (memory 106). Flow continues to 204 where the block A is returned to the L2 cache 103 and the LLC_reuse_hint[A] bit is set to 0.

Figure 3:
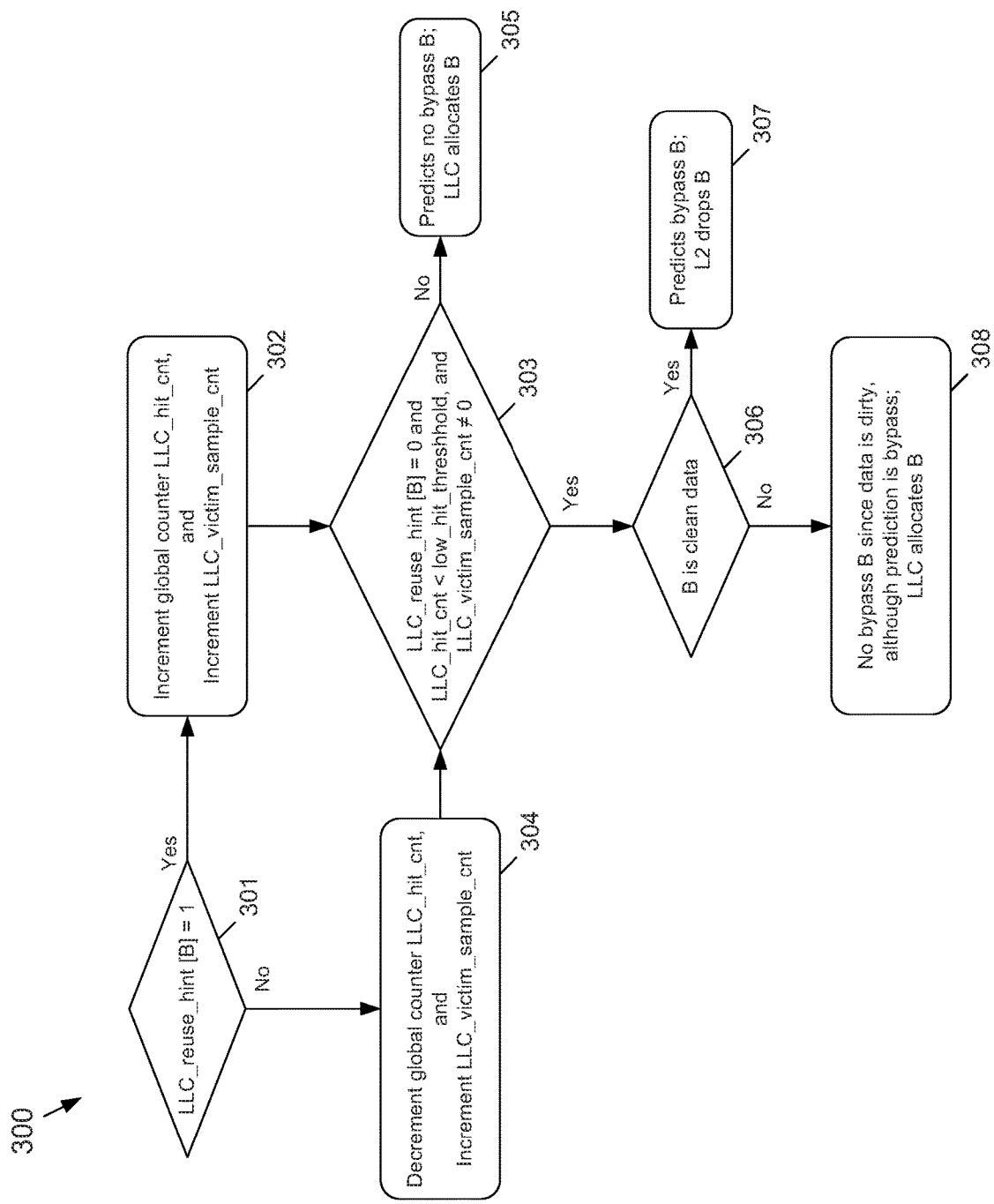
FIG. 3 depicts a flowchart of an example embodiment of a process used by the bypass predictor that may occur upon an eviction of a block B of data from an L2 cache according to the subject matter disclosed herein.

FIG. 3 depicts a flowchart of an example embodiment of a process 300 used by the bypass predictor 101 that may occur upon an eviction of a block B of data from an L2 cache 103 according to the subject matter disclosed herein. At 301, it is determined whether the LLC_reuse_hint[B] is equal to 1. If so, flow continues to 302 where the global counter LLC_hit_cnt is incremented indicating that no bypass in the LLC 104. Additionally, the LLC_victim_sample_cnt is incremented. Flow continues to 303.

If, at 301, the LLC_reuse_hint[B] is equal to 0, flow continues to 304 where the global counter LLC_hit_cnt is decremented indicating that the victim block B is to bypass the LLC 104. Additionally, the LLC_victim_sample_cnt is incremented. Flow continues to 303.

At 303 it is determined (1) whether the LLC_reuse_hit[B] equals 0, (2) the LLC_hit_cnt is less than low_hit_threshold, and (3) the LLC_victim_sample_cnt does not equal to 0. If these three conditions are not met, flow continues to 305 where the predictor indicates that there should be no bypass of the LLC 104 for the victim block B and the LLC 104 allocates space for the block B.

If at 303, all three conditions are met, flow continues to 306 where it is determined whether B is clean data. If so, flow continues to 307 where the bypass predictor 101 indicates that the victim block B should bypass the LLC 104 and the L2 cache 103 drops block B.

If at 306, it is determined that the block B is not clean data, flow continues to 308 where the block B is not bypassed from the LLC 104 because the data is dirty even though the bypass predictor 101 may indicate that the block B may bypass the LLC. Instead, the LLC 104 allocates space for the victim block B.

The LLC_reuse_hint bit may be configurable based on other conditions to provide an increase in the confidence of the prediction provided by the bypass predictor 101. For example, if on the occurrence of an L2 cache 103 hit for a block A, the LLC_reuse_hint bit for the accessed block A may be set regardless whether it was hit or not in the LLC 104. Thus, bypass predictor 101 may be able to quickly react to program phase changes from no-LLC-reuse to LLC-reuse.

Figure 4:
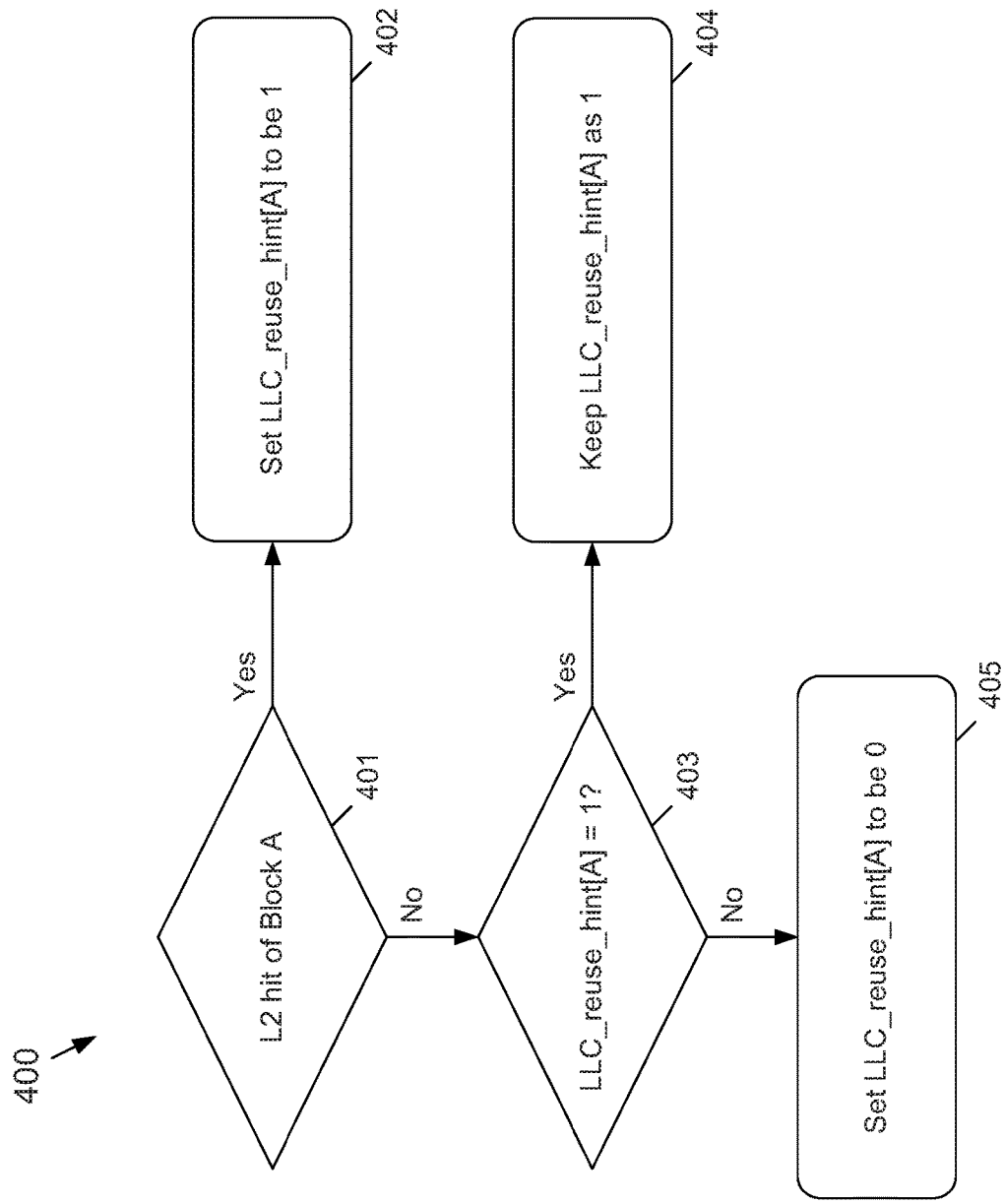
FIG. 4 depicts a flowchart of an example embodiment of a process used by the bypass predictor that may occur if the LLC_reuse_hint bit for the block A is configurable based on a cache hit on a block A in the L2 cache according to the subject matter disclosed herein.

FIG. 4 depicts a flowchart of an example embodiment of a process 400 used by the bypass predictor 101 that may occur if the LLC_reuse_hint bit for the block A is configurable based on a cache hit on a block A in the L2 cache 103 according to the subject matter disclosed herein. In particular, the process 400 makes a bypass indication more conservative. At 401, upon a cache hit for the block A in the L2 cache 103, the LLC_reuse_hint[A] bit for the block A is set to be equal to 1 at 402 indicating to not perform a bypass. If there is no cache hit for the block A at 401, flow continues to 403 where it is determined whether the LLC_reuse_hint[A] bit for the block A equals 1. If so, flow continues to 404 where the LLC_reuse_hint[A] bit for the block A is kept at 1. If, at 403, the LLC_reuse_hint[A] for block A is not equal to 1, flow continues to 405 where the LLC_reuse_hint[A] for block A is set to be 0. Thus, the decision at 403 keeps the value of the LLC_reuse_hint[A] bit unchanged if the block A does not have a hit in the L2 cache at 401.

As an alternative embodiment to the example process 300 depicted in FIG. 3, instead of allocating dirty data in LLC 104 regardless of the prediction, dirty blocks predicted to be bypassed may be written back directly to DRAM (memory 106) without allocating to the LLC 104, thereby saving cache capacity and power.

Figure 5:
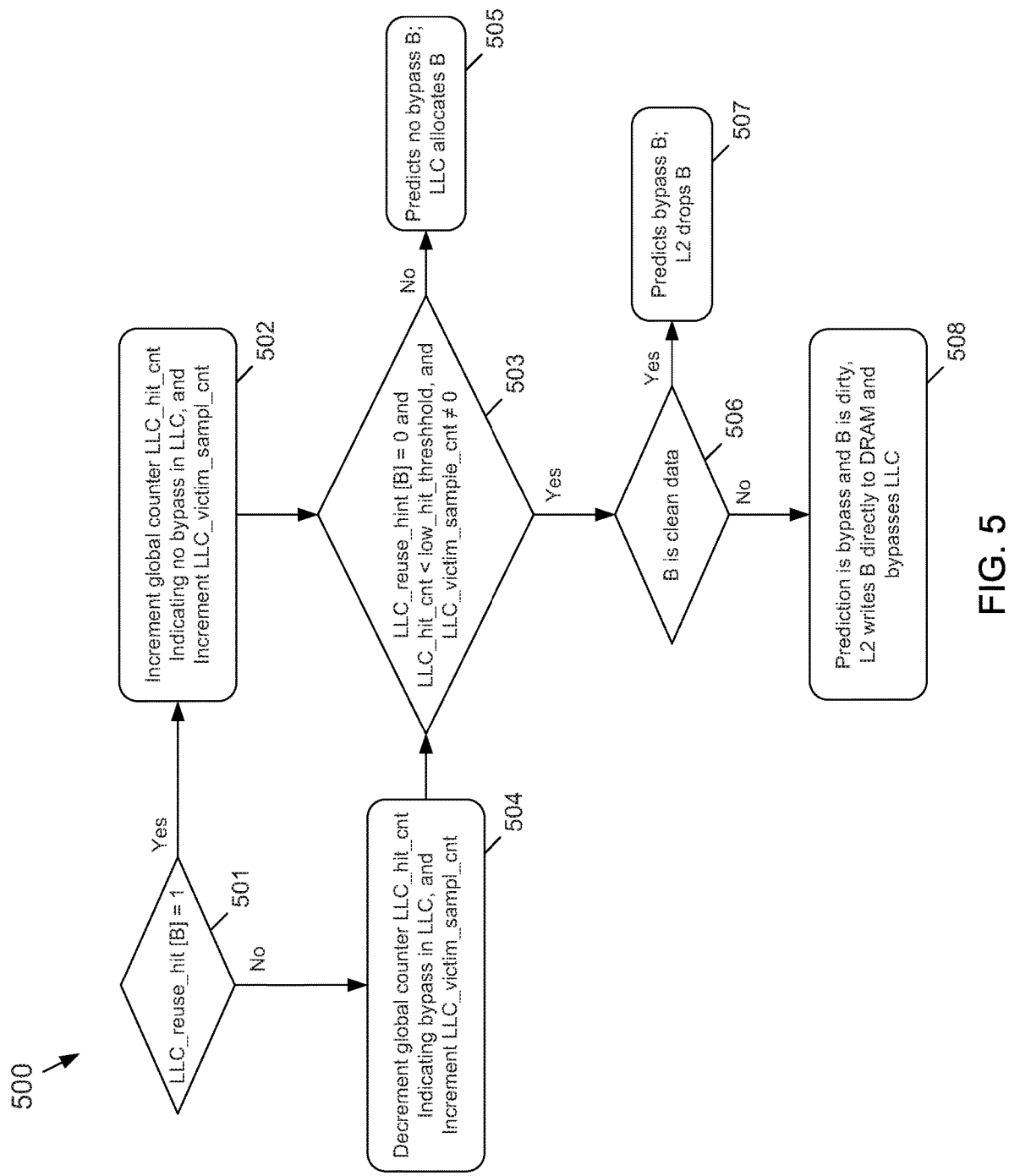
FIG. 5 depicts a flowchart of an alternative example embodiment of a process used by the bypass predictor that may occur upon an eviction of a block B of data from the L2 cache according to the subject matter disclosed herein.

FIG. 5 depicts a flowchart of an alternative example embodiment of a process 500 used by the bypass predictor 101 that may occur upon an eviction of a block B of data from the L2 cache 103 according to the subject matter disclosed herein. At 501, upon the eviction of a block B of data from the L2 cache 103, it is determined whether the LLC_reuse_hint[B] is equal to 1. If so, flow continues to 502 where the global counter LLC_hit_cnt is incremented indicating that no bypass in the LLC 104. Additionally, the LLC victim_sample_cnt is incremented. Flow continues to 503.

If, at 501, the LLC_reuse_hint[B] is equal to 0, flow continues to 504 where the global counter LLC_hit_cnt is decremented indicating that the victim block B is to bypass the LLC 104. Additionally, the LLC_victim_sample_cnt is incremented. Flow continues to 503.

At 503 it is determined (1) whether the LLC_reuse_hit[B] equals 0, (2) the LLC_hit_cnt is less than low_hit_threshold, and (3) the LLC_victim_sample_cnt does not equal 0. If these three conditions are not met, flow continues to 505 where the bypass predictor 101 indicates that there should be no bypass of the LLC 104 for the victim block B and the LLC 104 allocates space for the block B.

If at 503, all three conditions are met, flow continues to 506 where it is determined whether B is clean data. If so, flow continues to 507 where the bypass predictor 101 indicates that the victim block B should bypass the LLC 104 and the L2 cache 103 drops block B.

If at 506, it is determined that the block B is not clean data, flow continues to 508 where the prediction for the block B of data is to bypass the LLC 104. Since the data is dirty, the L2 cache 103 writes the block B of data directly to DRAM (memory 106), thereby bypassing the LLC 104.

In one example embodiment, upon eviction of a block B of data from the L2 cache 103, the bypass predictor 101 may downgrade the block B of data in the LLC 104 to least-recently used position as opposed to completely bypassing the LLC 104.

Figure 6:
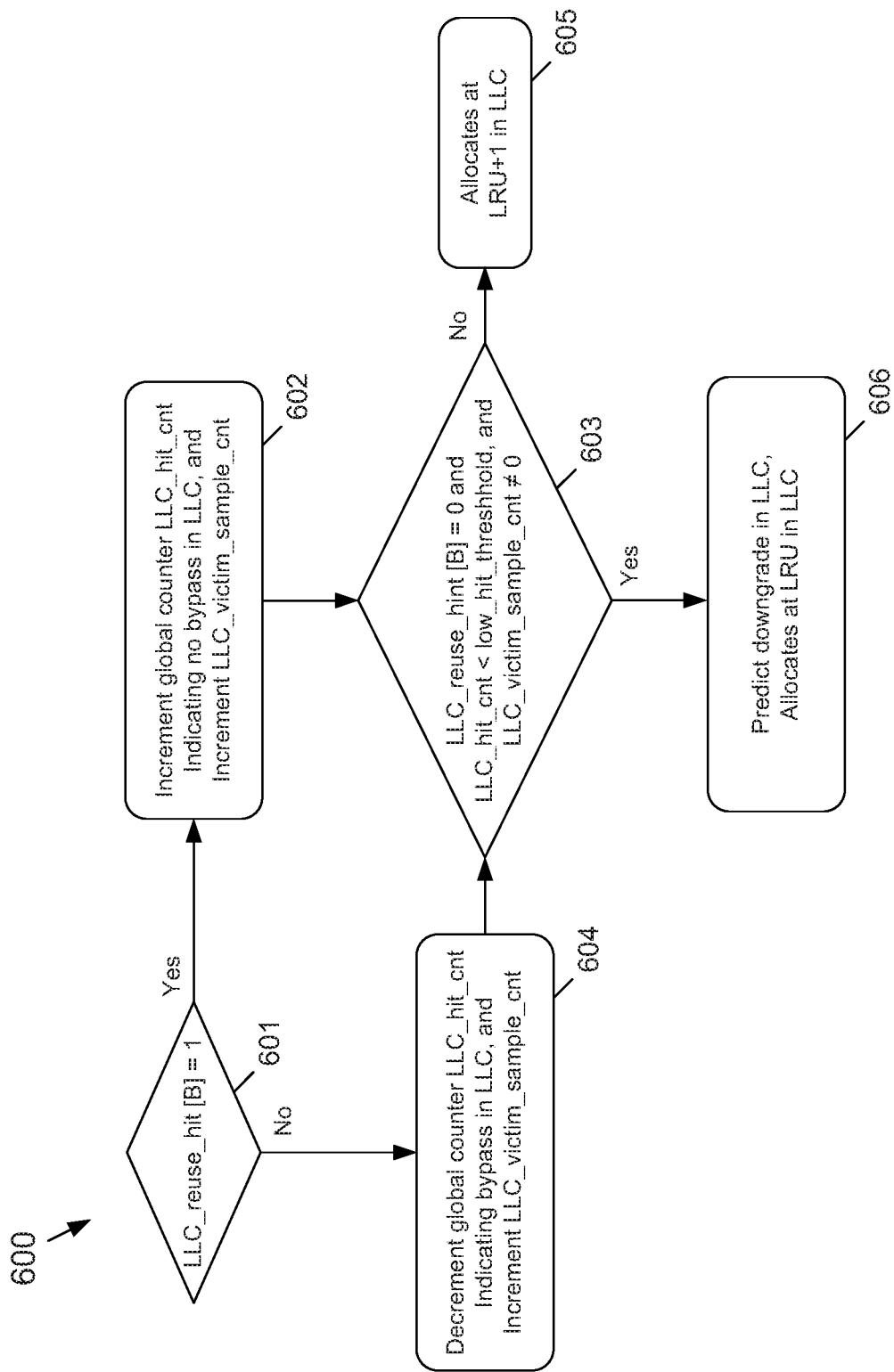
FIG. 6 depicts a flowchart of an example alternative embodiment of a process used by the bypass predictor that may occur upon an eviction of a block B of data from an L2 cache according to the subject matter disclosed herein.

FIG. 6 depicts a flowchart of an example alternative embodiment of a process 600 used by the bypass predictor 104 that may occur upon an eviction of a block B of data from an L2 cache 103 according to the subject matter disclosed herein. At 601, upon the eviction of a block B of data from the L2 cache 103, it is determined whether the LLC_reuse_hint[B] is equal to 1. If so, flow continues to 602 where the global counter LLC_hit_cnt is incremented indicating that no bypass in the LLC 104. Additionally, the LLC victim_sample_cnt is incremented. Flow continues to 603.

If, at 601, the LLC_reuse_hint[B] is equal to 0, flow continues to 604 where the global counter LLC_hit_cnt is decremented indicating that the victim block B is to bypass the LLC 104. Additionally, the LLC_victim_sample_cnt is incremented. Flow continues to 603.

At 603 it is determined (1) whether the LLC_reuse_hit[B] equals 0, (2) the LLC_hit_cnt is less than low_hit_threshold, and (3) the LLC_victim_sample_cnt does not equal 0. If these three conditions are not met, flow continues to 605 where the bypass predictor 101 indicates that the block B of data should be allocated to a location above a least recently used (LRU) location in the LLC 104.

If at 603, all three conditions are met, flow continues to 606 where the prediction downgrades the block B of data and the LLC 104 allocates the block B of data in a LRU location in the LLC 104.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to allocate data evicted from a first cache to a second cache, the method comprising:
   determining upon eviction of a block of data from the first cache whether a reuse indicator for the block of data indicates that the block of data has been reused from the first cache or the second cache, the first cache being a higher level cache than the second cache;
   incrementing a first counter based on the reuse indicator for the block of data indicating that the block of data has been reused;
   decrementing the first counter based on the reuse indicator for the block of data indicating that the block of data has not been reused;
   incrementing a second counter upon eviction of the block of data from the first cache;
   comparing a value of the first counter to a first predetermined threshold;
   determining whether a value of the second counter is equal to zero;
   allocating the block of data to the second cache based on the value of the first counter being equal to or greater than the first predetermined threshold or the value of the second counter equaling zero; and
   writing the block of data to a system memory while bypassing the second cache based on the value of the first counter being less than the first predetermined threshold and the value of the second counter being not equal to zero.

2. The method of claim 1, further comprising:
   receiving a request for the block of data in the first cache;
   setting the reuse indicator to indicate that the block of data has been reused based on the request for the block of data being a hit in the second cache; and
   setting the reuse indicator to indicate that the block of data has not been reused based on the request for the block of data being a miss in the second cache.

3. The method of claim 1, further comprising:
   receiving a request for the block of data in the first cache;
   setting the reuse indicator to indicate that the block of data has been reused based on the request for the block of data being a hit in the first cache; and
   setting the reuse indicator to indicate that the block of data has not been reused based on the request for the block of data being a miss in the first cache.

4. The method of claim 1, wherein writing the block of data to the system memory while bypassing the second cache based on the value of the first counter being less than the first predetermined threshold and the value of the second counter being not equal to zero further comprises:
   bypassing the block of data from the second cache based on the block of data being clean data; and
   allocating the block of data to the second cache based on the block of data being dirty data.

5. The method of claim 1, wherein writing the block of data to the system memory while bypassing the second cache based on the value of the first counter being less than the first predetermined threshold and the value of the second counter being not equal to zero further comprises:
   dropping the block of data from the first cache based on the block of data being clean data; and
   writing the block of data to the system memory based on the block of data being dirty data.

6. The method of claim 1, wherein the second cache is a last-level cache.

7. A method to allocate data evicted from a first cache to a second cache, the method comprising:
   determining upon eviction of a block of data from the first cache whether a reuse indicator for the block of data indicates that the block of data has been reused from the first cache or the second cache, the first cache being a higher level cache than the second cache;
   incrementing a first counter based on the reuse indicator for the block of data indicating that the block of data has been reused;
   decrementing the first counter based on the reuse indicator for the block of data indicating that the block of data has not been reused;
   incrementing a second counter upon eviction of the block of data from the second cache;
   determining whether a value of the first counter is less than a first predetermined threshold;
   determining whether a value of the second counter is equal to zero;
   allocating the block of data to a location in the second cache that is above a least recently used location in the second cache based on the value of the first counter being equal to or greater than the first predetermined threshold or the value of the second counter equaling zero; and
   allocating the block of data in the least recently used location in the second cache based on the value of the first counter being less than the first predetermined threshold and the value of the second counter being not equal to zero.

8. The method of claim 7, further comprising:
   receiving a request for the block of data in the first cache;
   setting the reuse indicator to indicate that the block of data has been reused based on the request for the block of data being a hit in the first cache; and
   setting the reuse indicator to indicate that the block of data has not been reused based on the request for the block of data being a miss in the first cache.

9. The method of claim 7, further comprising:
   receiving a request for the block of data in the first cache;
   setting the reuse indicator to indicate that the block of data has been reused based on the request for the block of data being hit in the first cache and the reuse indicator being configurable in response to a request for the block of data; and
   setting the reuse indicator to indicate that the block of data has not been reused based on the request for the block of data being a miss in the first cache and the reuse indicator being configurable in response to a request for the block of data.

10. The method of claim 7, wherein the second cache is a last-level cache.

11. A cache system, comprising:
a first cache comprising at least one block of data, each block of data comprising a tag, each tag comprising a plurality of bits, at least one bit of each tag providing a reuse indicator that a corresponding block of data has been reused;
a second cache that is a lower-level cache than the first cache; and
a cache controller coupled to the first cache and the second cache, the cache controller comprising a first counter and a second counter, the cache controller configured to increment the first counter based on the reuse indicator for a first block of data indicating that the first block of data has been reused from the first cache or the second cache upon eviction from the first cache and decrement the first counter based on the reuse indicator for the first block of data indicating that the first block of data has not been reused upon eviction from the first cache, the cache controller further configured to increment a second counter upon eviction of the first block of data from the first cache, provide an indication to allocate the first block of data to the second cache based on a value of the first counter being equal to or greater than a first predetermined threshold or a value of the second counter equaling zero, and provide an indication for the first block of data to bypass the second cache based on the value of the first counter being less than the first predetermined threshold and the value of the second counter being not equal to zero.

12. The cache system of claim 11, wherein the cache controller is configured to set the reuse indicator for the first block of data to indicate that the first block of data has been reused based on a request for the first block of data in the first cache being a hit, and sets the reuse indicator for the first block of data to indicate that the first block of data has not been reused based on the request for the first block of data in the first cache being a miss.

13. The cache system of claim 11, wherein the cache controller is configured to set the reuse indicator for the first block of data to indicate that the first block of data has been reused based on a request for the block of data in the second cache being a hit, and sets the reuse indicator to indicate that the first block of data has not been reused based on the request for the first block of data in the second cache being a miss.

14. The cache system of claim 11, wherein the cache controller is configured to provide an indication for the first block of data to bypass the second cache based on the first block of data being clean data, and provides an indication to allocate the first block of data in the second cache based on the block of data being dirty data.

15. The cache system of claim 11, wherein the cache controller is configured to provide an indication to drop the first block of data from the first cache based on the first block of data being clean data, and provides an indication to write the first block of data to a memory based on the first block of data being dirty data.

16. The cache system of claim 11, wherein the second cache is a last-level cache.

17. A cache system, comprising:
a first cache comprising at least one block of data, each block of data comprising a tag, each tag comprising a plurality of bits, at least one bit of each tag providing a reuse indicator that a corresponding block of data has been reused from the first cache;
a second cache that is a lower-level cache than the first cache, the reuse indicator for the block of data further indicating that the block of data has been reused from the second cache; and
a cache controller coupled to the first cache and the second cache, the cache controller comprising a first counter and a second counter, the cache controller configured to increment the first counter based on the reuse indicator for a first block of data indicating that the first block of data has been reused upon eviction from the first cache and decrement the first counter based on the reuse indicator for the first block of data indicating that the first block of data has not been reused upon eviction from the first cache, the cache controller further configured to increment a second counter upon eviction of the first block of data from the first cache, provide an indication to allocate the first block of data to the second cache in a location above a least recently used (LRU) location based on a value of the first counter being equal to or greater than a first predetermined threshold or a value of the second counter equaling zero, and provide an indication to allocating the first block of data in a least recently used location in the second cache based on the value of the first counter being less than the first predetermined threshold and the value of the second counter being not equal to zero.

18. The cache system of claim 17, wherein the cache controller is configured to set the reuse indicator for the first block of data to indicate that the first block of data has been reused based on a request for the first block of data in the first cache being a hit, and sets the reuse indicator for the first block of data to indicate that the first block of data has not been reused based on the request for the first block of data in the first cache being a miss.

19. The cache system of claim 17, wherein the cache controller is configured to set the reuse indicator to indicate that the first block of data has been reused based on a request for the first block of data in the second cache being a hit, and sets the reuse indicator for the first block of data to indicate that the first block of data has not been reused based on the request for the first block of data in the second cache being a miss.

20. The cache system of claim 17, wherein the second cache is a last-level cache.

* * * * *